(12) United States Patent
Liao Lai (10) Patent No.: US 12,220,606 B2
(45) Date of Patent: Feb. 11, 2025

(54) EXERCISER

(71) Applicant: Shu-Chiung Liao Lai, Taichung (TW)

(72) Inventor: Shu-Chiung Liao Lai, Taichung (TW)

( * ) Notice: Subject to any disclaimer, the term of this patent is extended or adjusted under 35 U.S.C. 154(b) by 354 days.

(21) Appl. No.: 17/860,151

(22) Filed: Jul. 8, 2022

(65) Prior Publication Data

US 2024/0009513 A1   Jan. 11, 2024

(51) Int. Cl.
| | | |
|---|---|---|
| *A63B 21/005* | (2006.01) | |
| *A63B 21/22* | (2006.01) | |
| *A63B 22/00* | (2006.01) | |
| *F16H 57/02* | (2012.01) | |

(52) U.S. Cl.
CPC ...... *A63B 21/0051* (2013.01); *A63B 22/0056* (2013.01); *F16H 57/02* (2013.01); *A63B 21/225* (2013.01)

(58) Field of Classification Search
CPC .............. A63B 21/0051; A63B 21/225; A63B 22/0056; F16H 57/02; F16H 1/06
See application file for complete search history.

(56) References Cited

U.S. PATENT DOCUMENTS

| | | | | |
|---|---|---|---|---|
| 5,322,491 A | * | 6/1994 | Wanzer | A63B 22/0056 482/52 |
| 7,422,548 B1 | * | 9/2008 | Teng | A63B 22/0012 482/57 |
| 9,199,115 B2 | * | 12/2015 | Yim | A63B 22/001 |
| 10,004,940 B2 | * | 6/2018 | Badarneh | A63B 24/0075 |
| 11,633,639 B2 | * | 4/2023 | Andersen | A63B 21/225 482/57 |
| 2002/0165068 A1 | * | 11/2002 | Fon | A63B 22/0605 482/57 |
| 2023/0054522 A1 | * | 2/2023 | Liao Lai | A63B 21/154 |
| 2024/0042270 A1 | * | 2/2024 | Liao Lai | A63B 21/4045 |

FOREIGN PATENT DOCUMENTS

TW    I766793 B    6/2022

* cited by examiner

*Primary Examiner* — Megan Anderson
(74) *Attorney, Agent, or Firm* — Best & Flanagan LLP (57) ABSTRACT

An exerciser has a frame, a driving assembly, a damping assembly, and a linkage assembly. The frame has a base, a front supporting rod, and a rear supporting rod, and a grip assembly. The driving assembly is mounted on the frame and has a gear box and two cranks. The gear box is mounted in the rear supporting rod and has a box body, an input axle, an input gear, two unidirectional bearings, an output gear, and multiple transmission gear sets. The input axle is mounted rotatably in the box body. The input gear is co-axially mounted securely on the input axle. The unidirectional bearings are mounted respectively on two ends of the input axle. The transmission gear sets are mounted between and engaged with the input gear and the output gear. Each crank has a first end connected with one of the unidirectional bearings.

7 Claims, 8 Drawing Sheets

EXERCISER

BACKGROUND OF THE INVENTION

1. Field of the Invention

The present invention relates to an exerciser, and more particularly to an exerciser for training strength and power of muscles of legs for sprint.

2. Description of Related Art

An Indoor exercisers, such Taiwan Patent No. 1766793, entitled "Leg Trainer" discloses that when two pedals (22) being stepped downward, two tension wheels (35) will be moved outward from each other by the tensions generated by two belts (34). Two pivotal arms (350) will expand two resilient members (351). The tension of the tension belts (34) will be reduced when the tension wheels (35) are moved outward from each other and the two resilient members (351) are expanded, such that the damping force at the initial when the pedals (22) being stepped downward will become small to cause a feeling empty to the user. Accordingly, when the user steps the pedals (22) downward to swing two swinging rods (21), an unsmooth feeling will occur. In addition, tolerance between two chains (24) and two sprockets (23) will increase the unsmooth feeling. The arrangement of a fixed damper composed of the two chains (24) and two driving resilient members (25) and a driving manner composed of two belts (34), two pulleys (31,32) and two transmission wheels (310,320) will also increase the unsmooth feeling.

To overcome the shortcomings, the present invention tends to provide an exerciser to mitigate or obviate the aforementioned problems.

SUMMARY OF THE INVENTION

The main objective of the invention is to provide an exerciser for training strength and power of muscles of legs for sprint.

The exerciser has a frame, a driving assembly, a damping assembly, and a linkage assembly. The frame has a base, a front supporting rod, and a rear supporting rod, and a grip assembly. The front supporting rod is mounted on a front end of the base. The rear supporting rod is mounted on the base. The grip assembly is mounted on the front supporting rod. The driving assembly is mounted on the frame and has a gear box and two cranks. The gear box is mounted in the rear supporting rod and has a box body, an input axle, an input gear, two unidirectional bearings, an output gear, and multiple transmission gear sets. The input axle is mounted rotatably in the box body. The input gear is co-axially mounted securely on the input axle. The unidirectional bearings are mounted respectively on two ends of the input axle. The output gear is mounted rotatably in the box body and has an output axle co-axially protruding from the output gear and extending out of the box body. The transmission gear sets are mounted between and engaged with the input gear and the output gear. Each crank has a first end connected with one of the unidirectional bearings, and a second end provided with a pedal. The damping assembly is mounted on the rear supporting rod and is connected to the driving assembly to provide a damping effect to the driving assembly. The linkage assembly is connected between the base of the frame and the two cranks to allow the two cranks to respectively swing in reverse directions.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 8, an exerciser in accordance with the present invention comprises a frame 10, a driving assembly 20, a damping assembly 30, and a linkage assembly 40.

The frame comprises a base 11, a front supporting rod 12, and a rear supporting rod 13. The front supporting rod 12 is mounted on a front end of the base 11. A grip assembly 120 is mounted on the front supporting rod 12 to allow a user to hold the grip assembly 120 while using the exerciser. The rear supporting rod 13 is mounted on the base 11. A seat 130 is mounted on a top of the rear supporting rod 13 to allow the user to sit on the seat 130. A damping controller 121 is mounted on the front supporting rod 12 to allow the user to control and switch the damping effect provided by the damping assembly 30. The driving assembly 20 is mounted on the frame 10 and comprises a gear box 21 and two cranks 22. The gear box 21 is mounted on the rear supporting rod 13 and comprises a box body, an input axle 210, an input gear 211, two unidirectional bearings 212, an output gear 213, and multiple transmission gear sets 214. The input axle 210 is mounted rotatably in the box body and has two ends extending out of the box body. The input gear 211 is co-axially mounted securely on the input axle 210. The two unidirectional bearings 212 are mounted respectively on the ends of the input axle 210, such that the input axle 210 can be driven to rotate unidirectionally by the unidirectional bearings 212. The output gear 213 is mounted rotatably in the box body of the gear box and has an output axle 215 co-axially protruding from the output gear and extending out of the box body. The transmission gear sets 214 are mounted between and engaged with the input gear 211 and the output gear 213. Each transmission gear set 214 comprises a pinion and a transmission gear co-axially connected with the pinion. Preferably, the gear box is a set-up gear box based on gear radio of the input gear 211, the out gear 213 and the transmission gear sets 214, such that a speed increasing effect can be achieved. Each crank 22 has a first end connected with one of the unidirectional bearings 212, and a second end provided with a pedal 220. Accordingly, when the cranks 22 are swinging downward and upward, the input axle 210 will be driven to rotate unidirectionally with the transmission of the unidirectional bearings 212.

The damping assembly 30 is mounted on the rear supporting rod 13 and is connected to the driving assembly 20 to provide a damping effect to the two cranks 22. The damping assembly 30 comprises a flywheel 31, a fixed damper 32, an adjustable damper 33, and a control cable 34. The flywheel is made of metal and is mounted co-axially at the end of the output axle 215 extending out of the box body, such that the flywheel can be driven to rotate with the output axle 215. The fixed damper 32 is mounted on the rear supporting rod 13 and has multiple magnetic members. With the magnetic force provided by the magnetic members, a damping effect can be provided to the flywheel 31. The adjustable damper 33 has a first end connected pivotally with the rear supporting rod and a second end. Multiple magnetic members are mounted on the adjustable damper 33. The adjustable damper 33 can be pivoted relative to the rear supporting rod 13 to move close to or away from the flywheel 31, such that the damping effect provided by the adjustable damper 33 to the flywheel 31 can be adjusted. The control cable 34 has a first end connected with the damping controller 121 and a second end connected with the second end of the adjustable damper 33. Accordingly, the adjustable damper 33 can be pivoted relative to the rear supporting rod 13 by the damping controller 121 with the control cable 34.

The linkage assembly 40 is connected between the rear supporting rod 13 and the two cranks 22 to allow the two cranks 22 to respectively swing in reverse directions. The linkage assembly 40 comprises two pivotal arms 41, a connection member 42, and two levers 43. One end of each pivotal arm 41 is connected pivotally to the rear supporting rod 13. The connection member 42 is connected to the pivotal arms 41 to allow that while one of the pivotal arms 41 is pivoted upward, and the other pivotal arm 41 is pivoted downward. Each lever 43 has a first end connected pivotally to one of the two crank 22 and a second end connected pivotally to an end of a corresponding one of the two pivotal arms 41. Accordingly, the two pivotal arms 41 can be pivoted by the levers 43.

Figure 1:
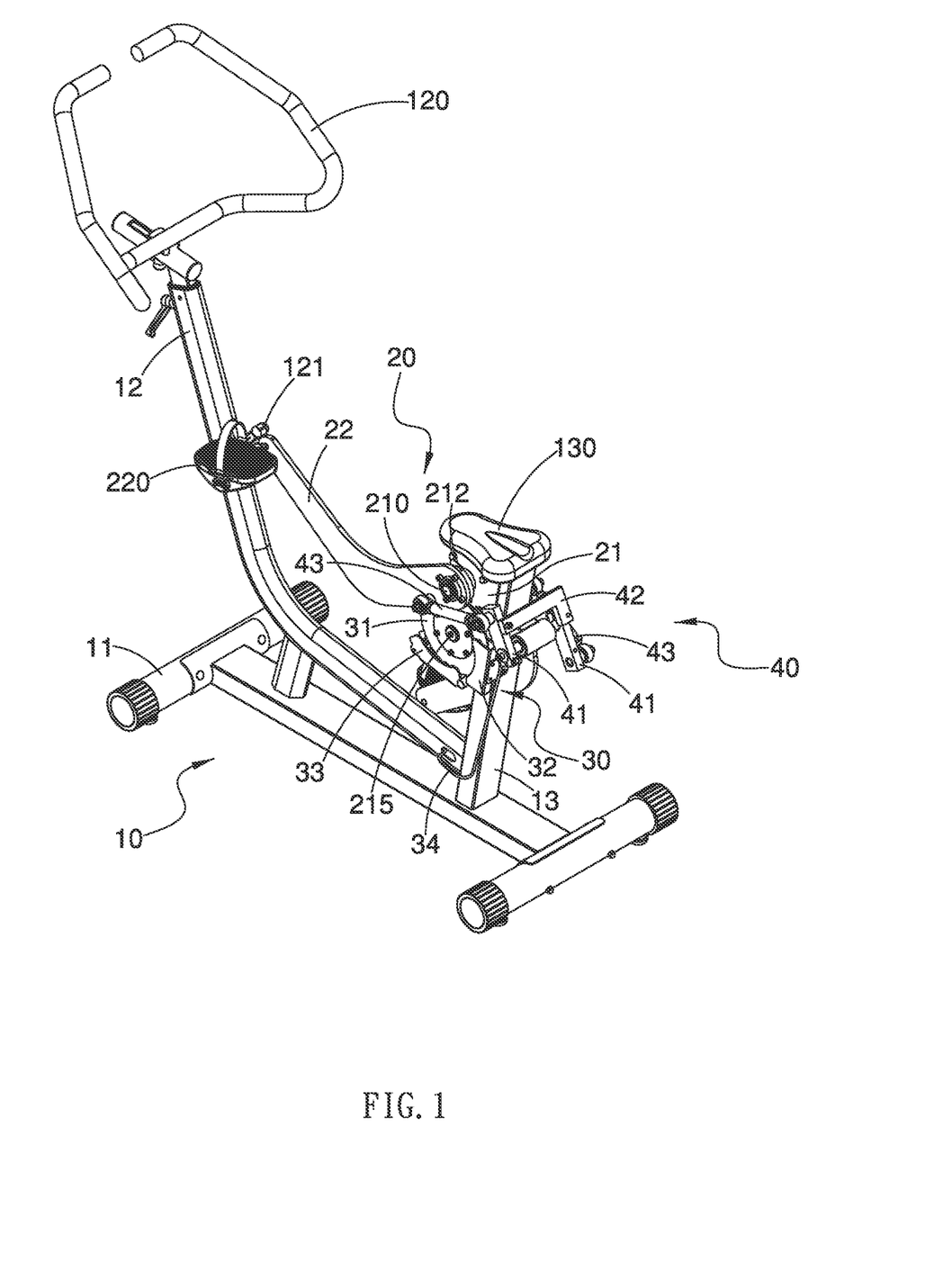
FIG. 1 is a perspective view of an exerciser in accordance with the present invention.
Figure 2:
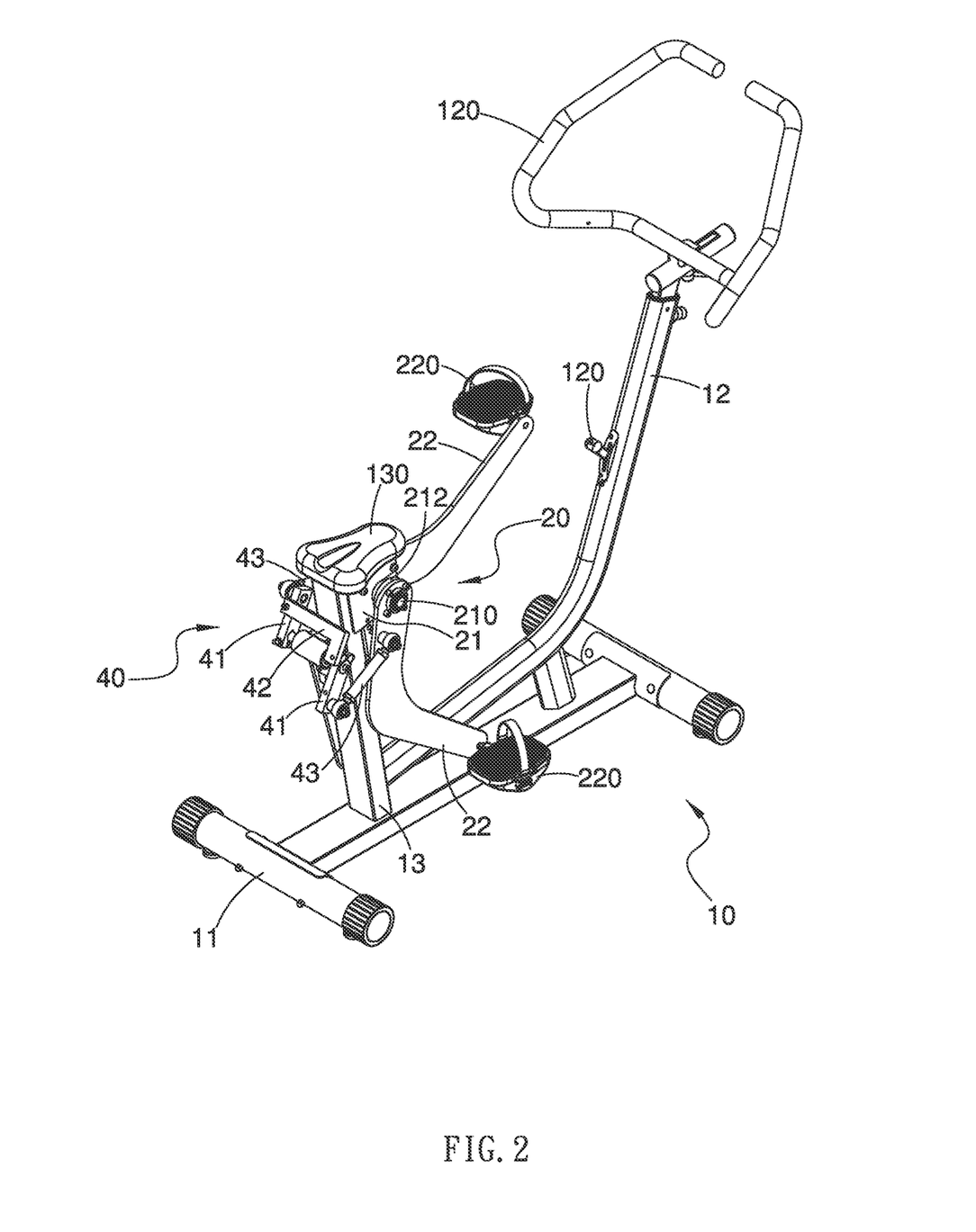
FIG. 2 is another perspective view of the exerciser in FIG. 1.
Figure 3:
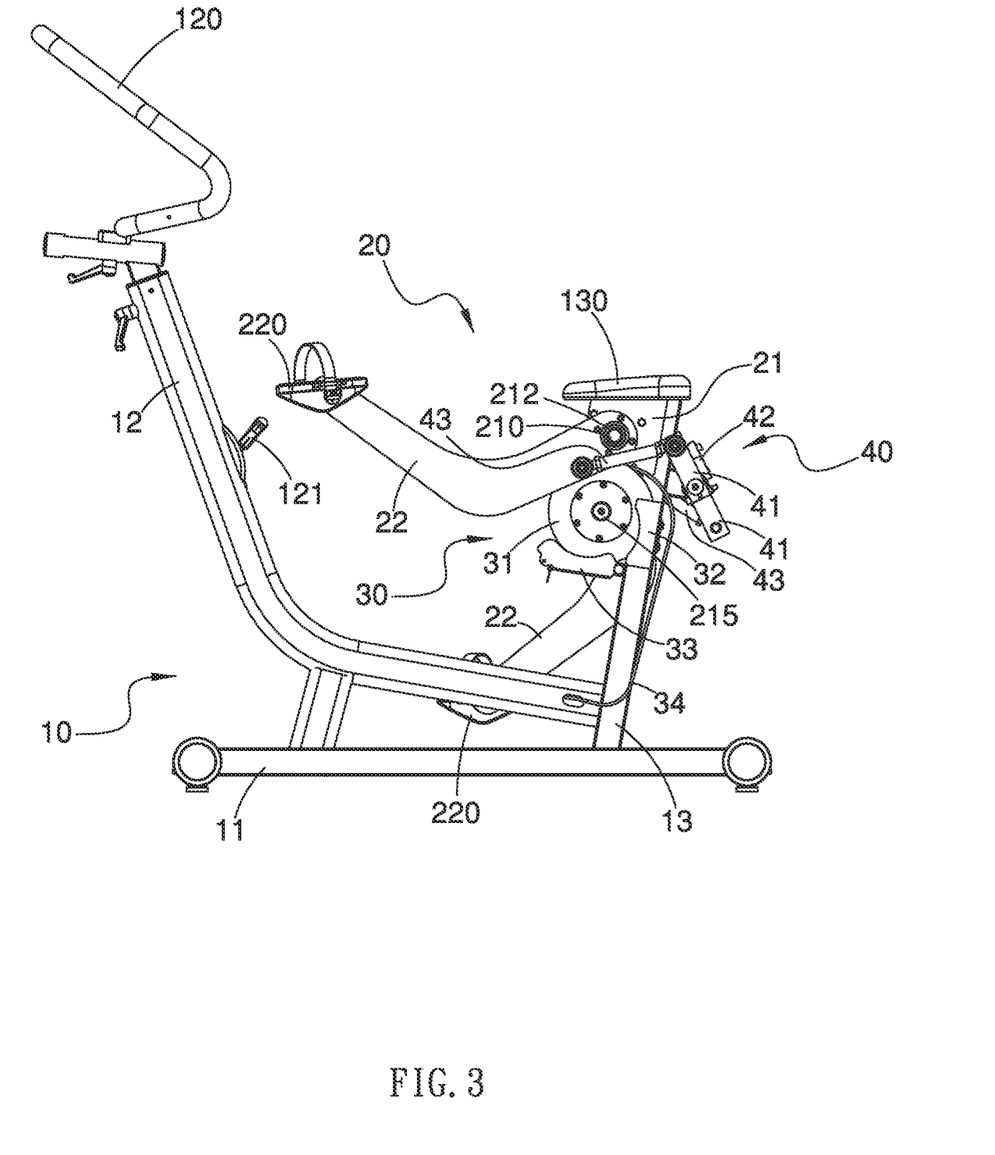
FIG. 3 is a side view of the exerciser in FIG. 1.
Figure 4:
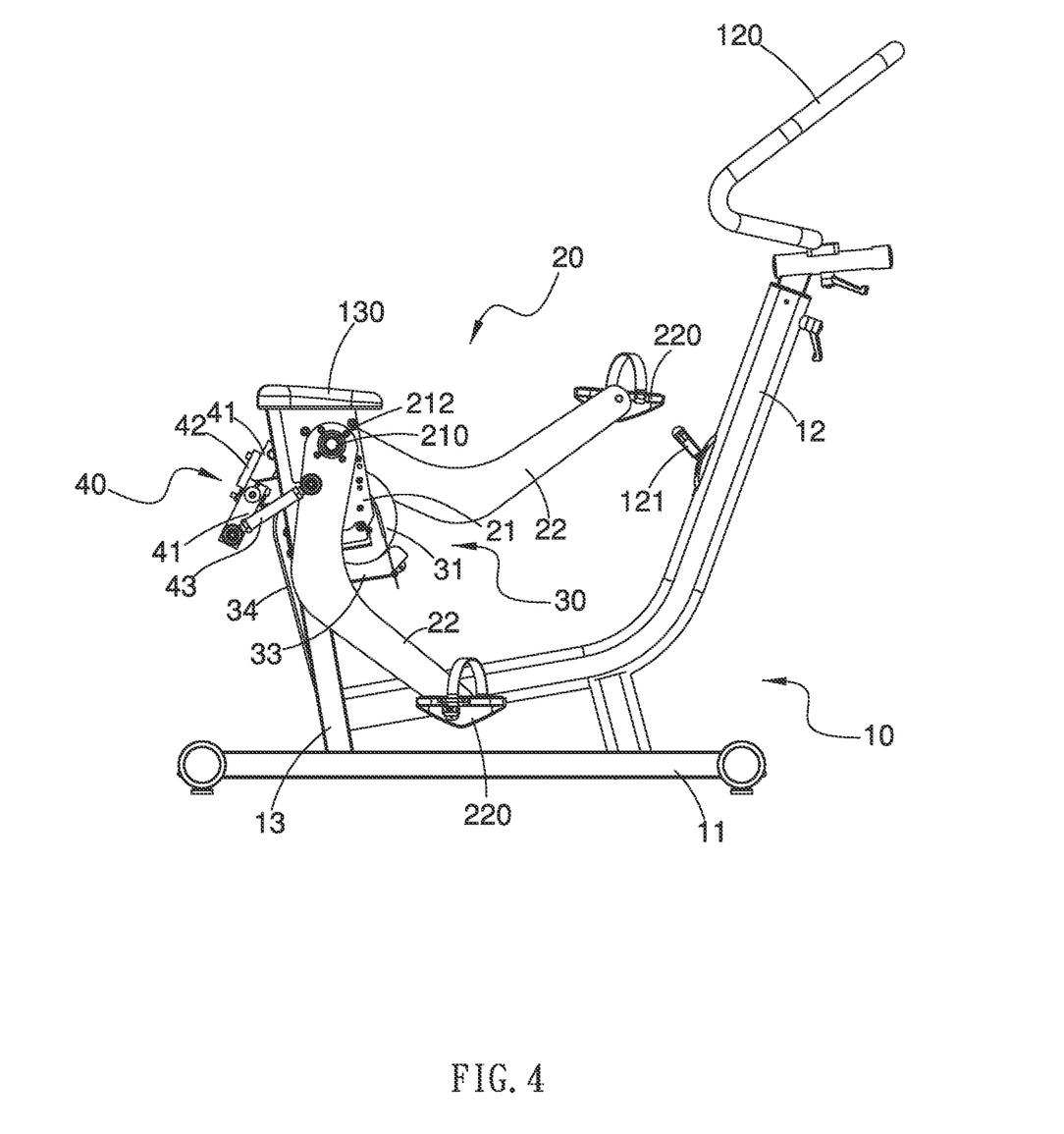
FIG. 4 is another side view of the exerciser in FIG. 1.
Figure 5:
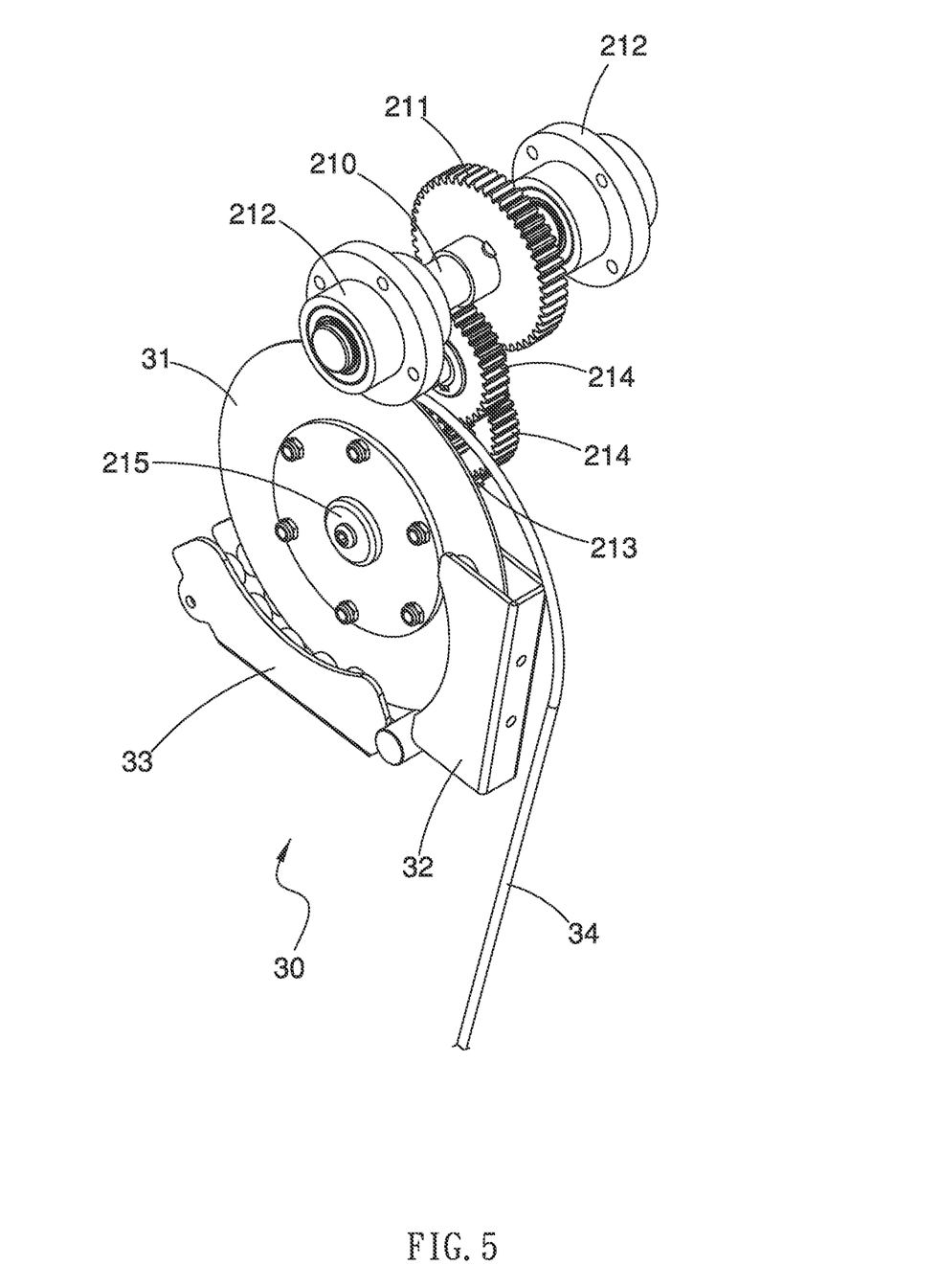
FIG. 5 is an enlarged perspective view of a gear box and an adjustable damper of the exerciser in FIG. 1.
Figure 6:
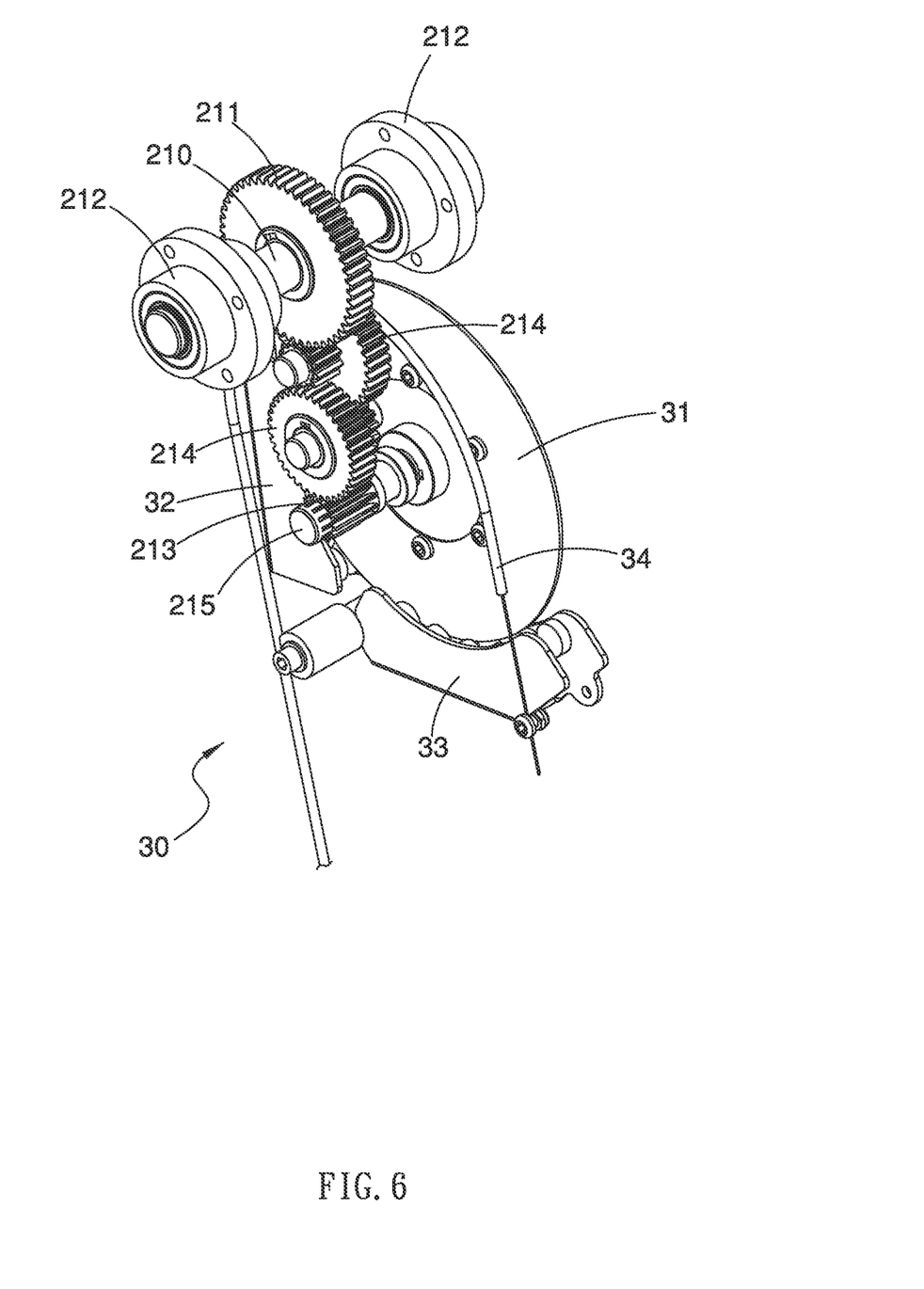
FIG. 6 is another perspective view of the gear box and the adjustable damper in FIG. 5.
Figure 7:
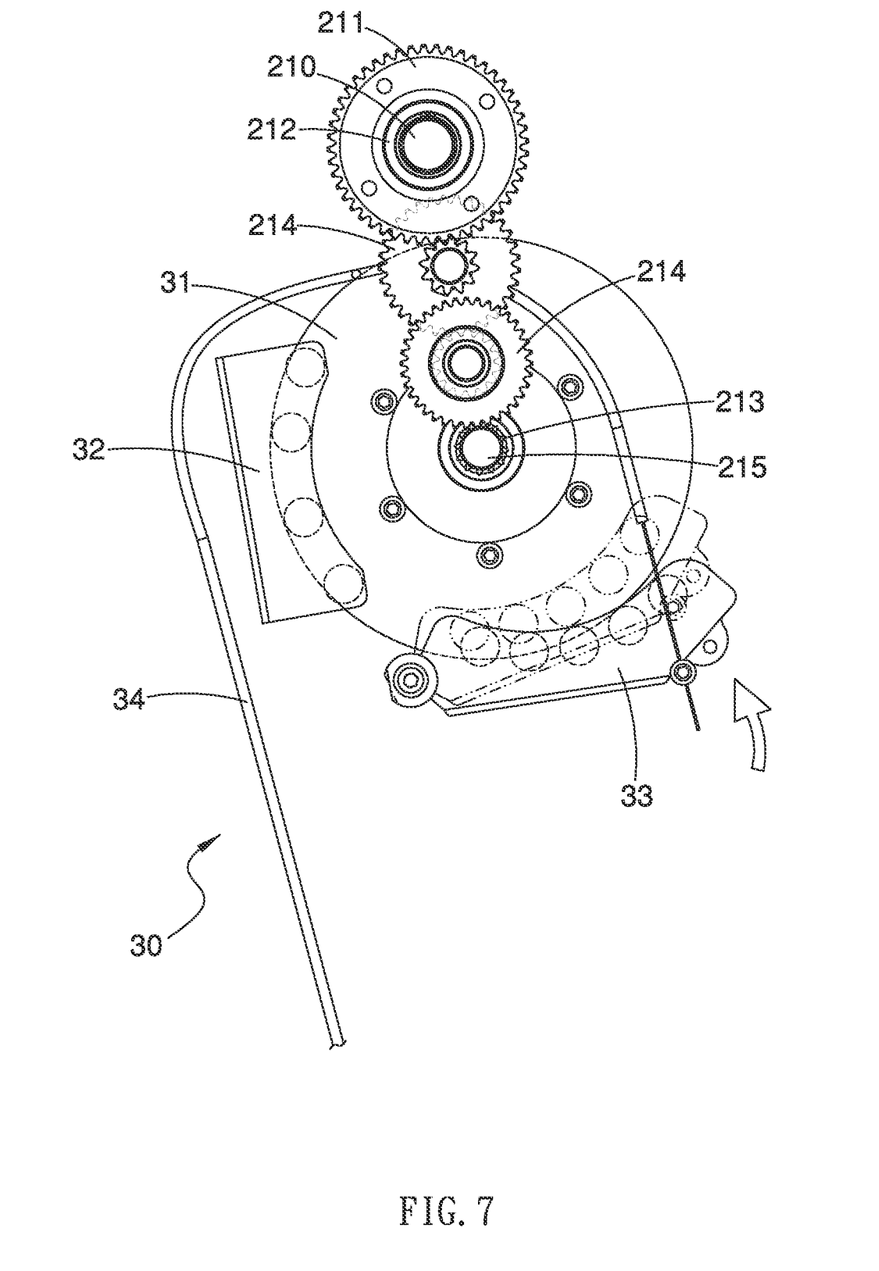
FIG. 7 is an operational side view of the gear box and the adjustable damper in FIG. 5.
Figure 8:
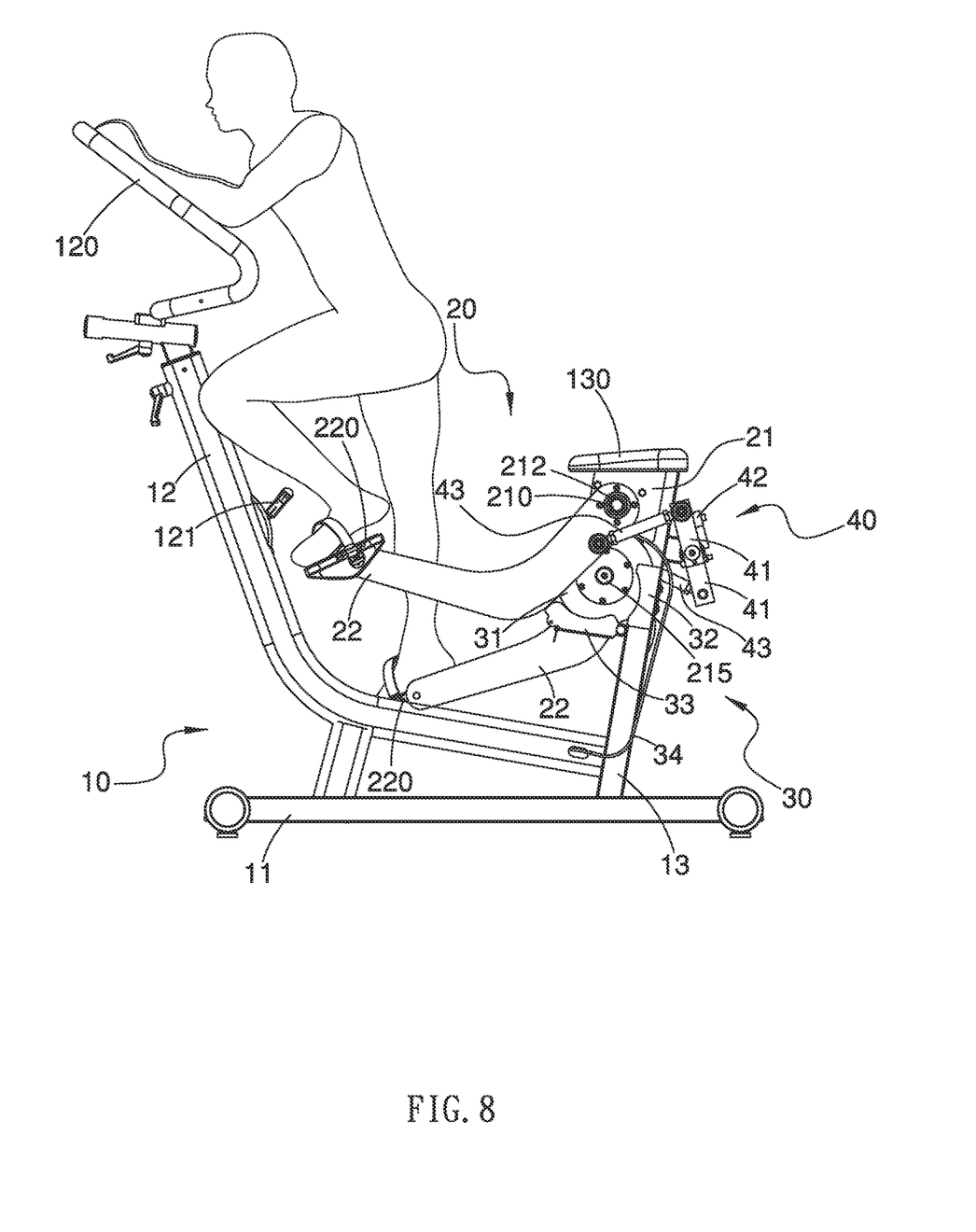
FIG. 8 is an operational side view of the exerciser in FIG. 1.

With such an exerciser, a user can hold the grip assembly 120 and steps on the pedals 220 to form a posture for sprint. The user can steps the pedals 22 alternately to swing the cranks 21 upward and downward, such that the fly wheel 31 can be rotated by the transmission of the gear box 21. With the damping force provided by the damper 32,33, the strength and power of the muscles of the legs of the user can be effectively trained. With the gears 211, 213, 214 in the gear box 21, the steeping force provided by the user can be actually transmitted to the flywheel 31, so the feeling empty and unsmooth feeling will not be occurred. In addition, the user can sit on the seat 130 for rest.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An exerciser comprising:
   a frame having:
     a base;
     a front supporting rod mounted on a front end of the base;
     a rear supporting rod mounted on the base; and
     a grip assembly mounted on the front supporting rod;
   a driving assembly mounted on the frame and comprising
     a gear box mounted in the rear supporting rod and comprising
       a box body;
       an input axle mounted rotatably in the box body;
       an input gear co-axially mounted securely on the input axle;
       two unidirectional bearings mounted respectively on two ends of the input axle;
       an output gear mounted rotatably in the box body and having an output axle co-axially protruding from the output gear and extending out of the box body; and
       multiple transmission gear sets mounted between and engaged with the input gear and the output gear; and
     two cranks, each having a first end connected with one of the two_unidirectional bearings, and a second end provided with a pedal;
   a damping assembly mounted on the rear supporting rod, connected with the output axle, and being driven by the gear box to generate a drug force to the driving assembly; and
   a linkage assembly connected between the rear supporting rod and the two cranks to allow the two cranks to respectively swing in reverse directions.

2. The exerciser as claimed in claim 1, wherein
   the frame further comprises a damping controller mounted on the front supporting rod;
   the damping assembly comprises
   a flywheel mounted co-axially with the output axle;
   an adjustable damper having a first end connected pivotally with the rear supporting rod and having multiple magnetic members; and
   a control cable having a first end connected with the damping controller and a second end connected with a second end of the adjustable damper.

3. The exerciser as claimed in claim 2, wherein the damping assembly further comprises a fixed damper mounted on the rear supporting rod and having multiple magnetic members.

4. The exerciser as claimed in claim 1, wherein the frame further comprises a seat mounted on a top of the rear supporting rod.

5. The exerciser as claimed in claim 1, wherein each transmission gear set of the multiple transmission gear sets comprises a pinion and a transmission gear co-axially connected with the pinion.

6. The exerciser as claimed in claim 1, wherein the gear box is a set-up gear box based on gear radio of the input gear, the out gear and the transmission gear sets.

7. The exerciser as claimed in claim 1, wherein the linkage assembly further comprises
   two pivotal arms connected pivotally to the rear supporting rod of the frame;
   a connection member connected to the two pivotal arms to allow that while one of the two pivotal arms is pivoted upward, and the other pivotal arm is pivoted downward; and
   two levers, each having a first end connected pivotally with one of the two cranks and a second end connected pivotally to a corresponding one of the two pivotal arms.

* * * * *